E. J. CRIDGE.
Cooking Stove.
No. 3,659. Reissued Oct. 5, 1869.
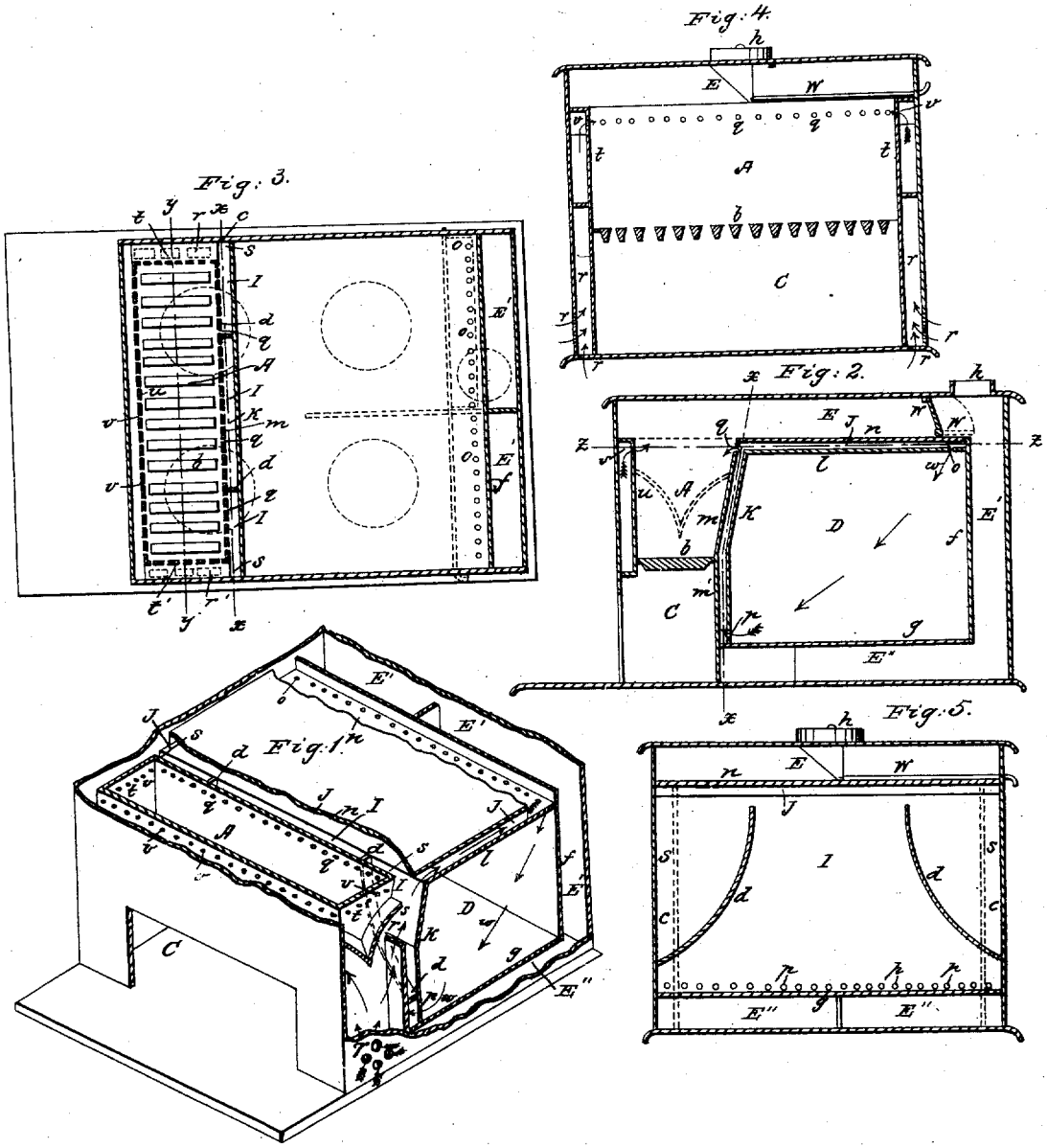
Witnesses:
Alphonso Pinod.
Austin F. Park
Inventor:
Edmund J. Cridge.
N. PETERS, Photo-Lithographer, Washington, D. C.

United States Patent Office.

EDMUND J. CRIDGE, OF TROY, NEW YORK.

*Letters Patent No.* 35,141, *dated May* 6, 1862; *reissue No.* 3,659, *dated October* 5, 1869.

COOKING-STOVE.

The Schedule referred to in these Letters Patent and making part of the same.

*To all whom it may concern:*

Be it known that I, EDMUND J. CRIDGE, of the city of Troy, in the county of Rensselaer, and State of New York, have invented a new and improved Cooking-Stove; and I do hereby declare that the following is a full, clear, and exact description thereof, reference being had to the accompanying drawings, making part of this specification, in which—

Figure 1 is an isometrical representation of one of my improved stoves, with portions of the upper part and one side broken away.

Figure 2 is a vertical section taken centrally through the stove from front to rear.

Figure 3 is a section taken through the stove in a horizontal plane indicated by line *z z* in fig. 2.

Figure 4 is a section taken vertically through the stove as indicated by line *y y* in fig. 3.

Figure 5 is a section taken through the stove in a vertical plane indicated by line *x x* in figs. 2 and 3.

Similar letters of reference indicate corresponding parts in the several figures.

This invention relates to certain novel improvements which are designed for supplying the flue-spaces, the oven, and the fire-chamber of a cooking-stove with warm air, for obtaining an equable heat in the oven, ventilating the oven, and also for effecting more perfect combustion of the gaseous products rising from the fire-chamber, as will be hereinafter explained.

To enable others skilled in the art to understand my invention, I will describe its construction and operation.

In the accompanying drawings—

A represents the fire-box, with a grate, *b*, at its bottom, arranged over an air-supplying ash-chamber, C.

D is the oven, which is arranged directly back of the said fire-box A and ash-chamber C.

E E′ E″ are smoke or gas-flues, which are extended from the top of the fire-box A, first over the top of the oven D, and thence along the back and bottom plates *f g* of the oven, to the exit-passage *h*.

I J, fig. 2, is an air-space, which is extended continuously along the front plate *k* and the top plate *l* of the oven, that is, between those plates and the back plate or back plates *m m′* of the fire-box A and ash-chamber C and bottom plate *n* of the upper fire-flue E.

The continuous air-space I J has communication with the oven D through an opening or openings, *o*, figs. 2 and 3, at or near the rear upper corner of the oven, and also by an aperture or apertures, *p*, figs. 2 and 5, at or near the lower front corner of the oven.

The continuous air-space I J, also has communication with the interior of the fire-chamber A by apertures *q*, figs. 1, 2, 3, and 4, leading from the upper part of the front portion of the said air-space into the rear part of, and above the place for the fuel in the said fire-chamber.

The hot-air space I J also has communication with the open air by suitable apertures or openings, as represented by letters *r r*, figs. 1 and 4, terminating in or leading into the ends of upright flue-space I, marked *s s*, in figs. 1, 2, and 5.

I wish it distinctly understood, that I do not restrict myself to the apertures placed in the exact position as represented by letters *r r*, figs. 1, 3, and 4, as in some cases it may be necessary to have the openings for the admission of cold air directly in the ends of flue-space I, or in the upper part of flue *t t*; and I generally prefer to have those air-passages extend along the sides *t t* and front *u* of fire-chamber A, and in communication with the interior of the latter by suitable openings or passages, as represented by letters *v v*, thereby promoting the combustion of the fuel and gases in the fire-chamber, substantially as indicated in figs. 1, 2, 3, and 4.

W is a damper, which can be set, as shown in full lines in fig. 2, so as to cause the products of combustion to pass through the flues E′ and E″, along the back and bottom of the oven, in moving from the top fire-flue E to the exit-opening *h*, and this damper W can also be set, as indicated in dotted lines in fig. 2, so as to allow the products to pass directly to the exit-aperture *h* from the flue E, without passing through the flues E′ E″, which latter will then be as dead-air spaces communicating with the flue E.

I am aware that it is not new to make a cooking-stove with a fire-chamber, A, grate *b*, ash-box C, oven D, fire-flues E E′ E″, and damper W, all arranged as specified and shown by the annexed drawings, and that it is not new to have such a stove made with an air-space located between the front of the oven and the back of the ash-box and fire-chamber, and communicating by apertures at its ends with the open air, and by an opening or openings at its bottom with the lower front corner of the interior of the oven; and also made with another air-space arranged between the top of the oven and the fire-flue over the oven, and in communication, by apertures at its rear end, with the back upper corner of the interior of the oven, and by apertures at its front end with the interior of the fire-chamber above the fuel therein, all as shown in G. G. Wolfe's Letters Patent numbered 30,514, A. D. 1860.

But there is an essential difference between my improved stove, shown by the annexed drawings, and the stove shown in the said patent to Wolfe. For, in the stove of Wolfe, the air-space on the front side of the oven is entirely separated at its upper end by a partition from the front end of the air-space on top of the oven, so that, however variably the front, top, back, and bottom plates of the oven may be heated with respect to each other by the fire-chamber and smoke-flues, the air in the space in front of the oven can only pass into the lower front part of the oven, and from the back upper corner of the oven into the hot-air space on top of the oven, and from that latter air-space into the fire-chamber above the fuel, that is, in the opposite direction to that shown by arrows *w* in the oven D in fig. 2 of the annexed drawings.

But in my improved stove it is essential that the horizontal air-space J on top of the oven D should be, at its front end, in direct communication with or form a continuation of the upright air-space I in front of the oven, so that there can be a free circulation of highly heated air through the continuous air-space I J and the oven D, either in the direction indicated by the arrows *w* in the oven in figs. 1 and 2, or in the opposite direction, according as such change in the direction of the current of heated air through the oven and air-space I J may be induced and become necessary to completely equalize the heat in all parts of the oven, when the front, back, and bottom plates of the oven are variably heated in respect to each other and to the top plate of the oven, as the smoke and gases are made to pass through all the flues E E′ E″ or only through the top flue E, and as more or less heat is conducted to and radiated against the plates *m m′* in front of the oven from the back and bottom of the fire-box.

I am also aware it is not new to make a cooking-stove with a hot-air space extended continuously over the top and more or less along the front side of the oven and next to the fire-box and ash-chamber, and with the said hot-air space either in communication with the open air, the oven and the smoke-flues to merely ventilate and heat the oven, or in communication with the interior of the fire-chamber above the fuel therein and with an oven having communication with the open air to promote the combustion of the gases evolved from the fuel, and to ventilate, and in a measure, equalize the heat within the oven by a current of air always passing in one and the same direction through the oven and the said hot-air space, examples being shown in numbers 28,482, 28,081, 24,791, 20,430, and 10,716, of United States Letters Patent, and I do not claim any such construction.

But I do believe that I first invented a cooking-stove combining the air-spaces I J, *t t*, and *u*, the fire-chamber A, oven D, draught-chamber C, fire-flues E E′ E″, damper W, and apertures or air-passages *o*, *p*, *q* and *r*, arranged substantially as shown by the accompanying drawings.

The partitions or deflecting plates *d d*, figs. 1 and 5, are arranged in the upright portion I of the continuous air-space I J, and extended from the end plates *c c*, to points below where the fresh air enters the ends *s s* of that air-space, inward and upward to, or toward the horizontal air-space J over the oven, in order to insure the passage of the comparatively cool air which enters the ends of the space I, upward, toward, or into the horizontal air-space J, and thereby cause the newly admitted air to become more highly heated before it can circulate through the hot-air flues I J and oven D, in either direction.

Having described my invention,

What I claim as new, and desire to secure by Letters Patent, is—

1. The combination of the continuous air-space I J, the oven D, fire-chamber A, draught-chamber C, and fire-flues E E′ E″, the latter provided with a damper W, substantially as set forth.

2. The air-flue or flues *t t* and *u*, having communication with the open air, fire-chamber A, and air-space or flue I J, substantially as set forth.

3. The arrangement of the deflecting-plates *d d* in the upright portion of the continuous air-space I J, in combination with the oven D, fire-chamber A, and fire-flues E E′ E″, and with the air passages *r o p* and *q*, or their equivalents, substantially as set forth.

4. The arrangement of the apertures or air-passages *r o p* and *q*, in combination with the continuous air-space I J, oven D, fire-chamber A, draught-chamber C, and fire-flues E E′ E″, provided with a valve or damper W, substantially as set forth.

EDMUND J. CRIDGE.

Witnesses:
JOHN MCKEEVER,
GEORGE W. NALONS.